Jan. 28, 1964  R. L. LEWIS ETAL  3,119,235
CONTROL VALVE
Filed Sept. 6, 1960  4 Sheets-Sheet 1

INVENTORS
RICHARD L. LEWIS
LESTER J. LARSEN
BY John A. Young
ATTORNEY

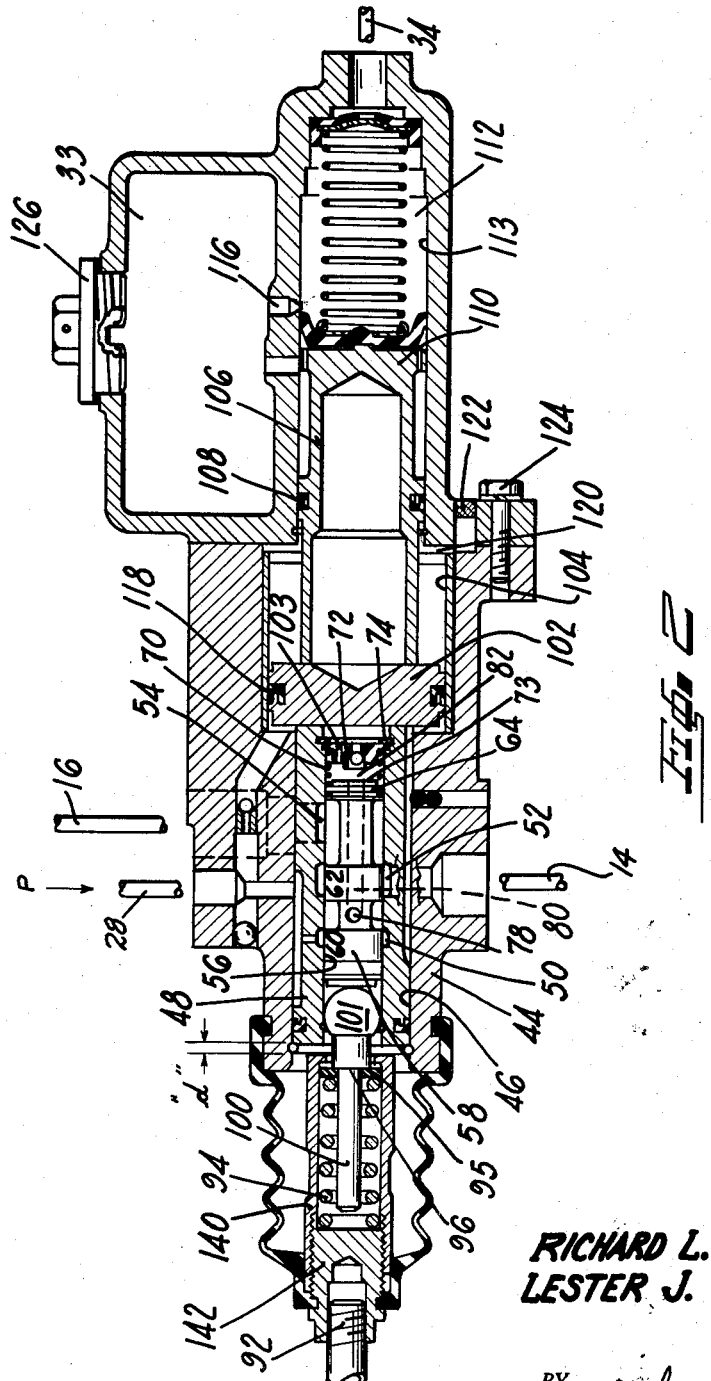

Jan. 28, 1964  R. L. LEWIS ETAL  3,119,235
CONTROL VALVE
Filed Sept. 6, 1960  4 Sheets-Sheet 3

RICHARD L. LEWIS
LESTER J. LARSEN
INVENTORS

BY John A. Young
ATTORNEY

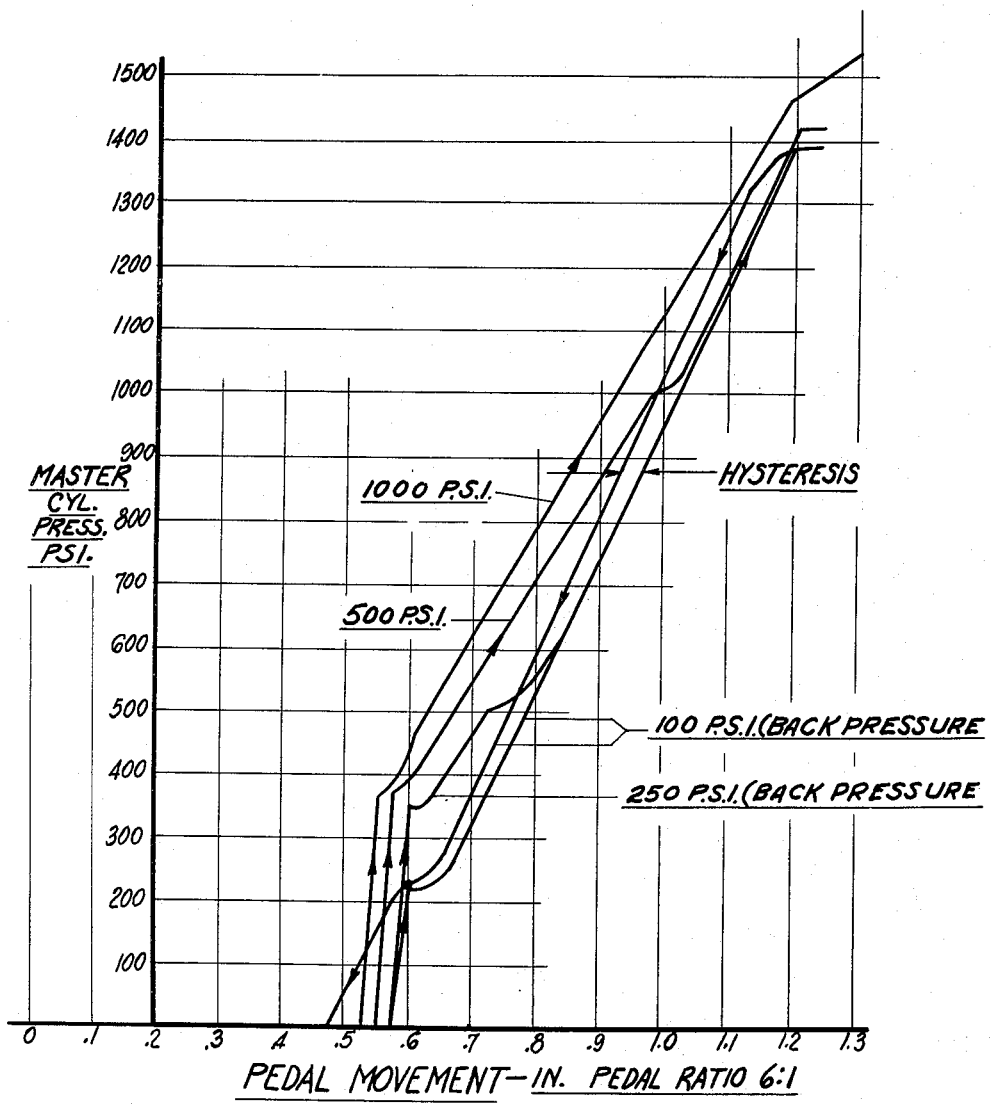

United States Patent Office 3,119,235
Patented Jan. 28, 1964

3,119,235
CONTROL VALVE
Richard L. Lewis and Lester J. Larsen, St. Joseph, Mich., assignors to The Bendix Corporation, South Bend, Ind., a corporation of Delaware
Filed Sept. 6, 1960, Ser. No. 54,069
5 Claims. (Cl. 60—54.5)

This invention relates to a control valve which is especially suited for obtaining power steering and power braking from a single pressure source.

It is one of the objects of the present invention to obtain both power steering and power braking in the vehicle without impairing the function of either the steering system or braking system even though each is operated through the same control valve.

Another object of the invention is to provide, by means of a single control valve, the fluid pressure requirements of a power steering system and a power braking system, even though their respective pressure and flow requirements may vary substantially from each other. This means, that maximum braking effort, will not deprive the power steering system of sufficient fluid under pressure to meet its requirements, and at the same time, changes in the fluid pressure requirements of the power steering will not affect the operation of the power brakes by excessive reaction through the pedal to the operator's foot.

Another object of the invention, is to provide a single control means which is adapted to operate a power steering system and a power braking system, each having a distinct fluid medium, neither fluid becoming admixed by operation of the control valve means. As a result, each of the two different systems, power steering and power braking is operated in accordance with its distinct fluid pressure requirements, without adversely affecting the other and with the power derived from a single pressure source; but, the fluid used for operating the brakes is separate from the fluid which is used for the power steering system. Therefore, the two separate fluids, can be formulated to meet the specific working requirements of these two different systems, power steering and power braking.

Other objects and features of the invention will become apparent from a consideration of the following descriptions, which proceeds with reference to the accompanying drawings, wherein:

FIGURE 2 is an enlarged sectional view taken through the longitudinal axis of the control valve shown in FIGURE 1;

Figure 6:
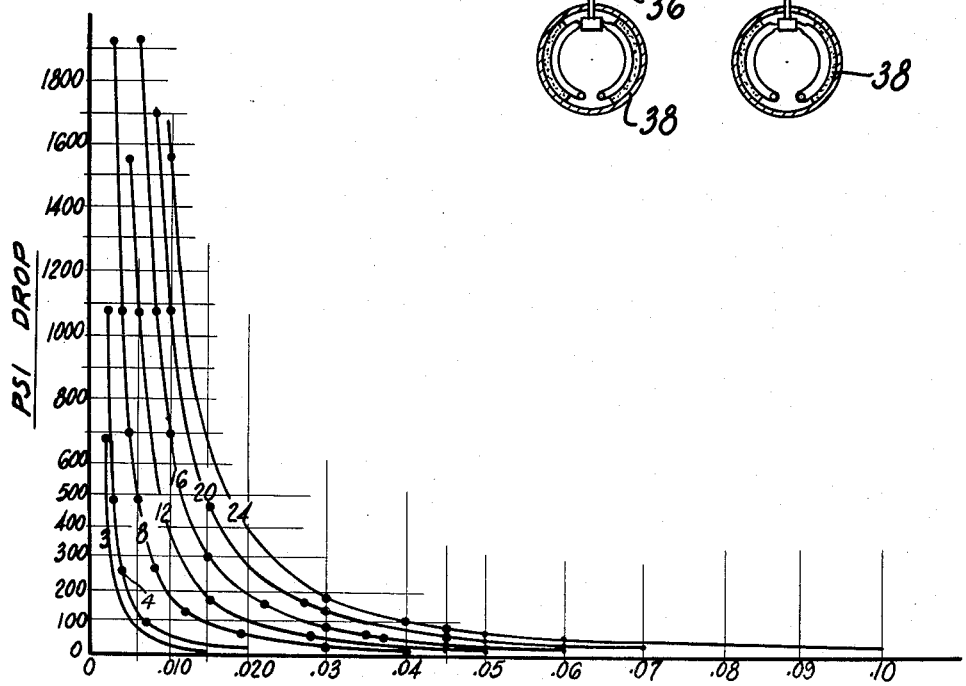

FIGURE 6 is a graph showing "Pressure Drop vs. Spool Land Opening," this graph serving to illustrate the importance underlying a proper proportioning of the land of the spool and the groove in the sleeve; and, FIGURE 7 is a graph plotting "Brake Pressure vs. Pedal Movement" at various power steering requirements and at engine idle condition. From this curve, maximum effect on pedal movement can be predicted as influenced by the power steering requirements.

Figure 1:
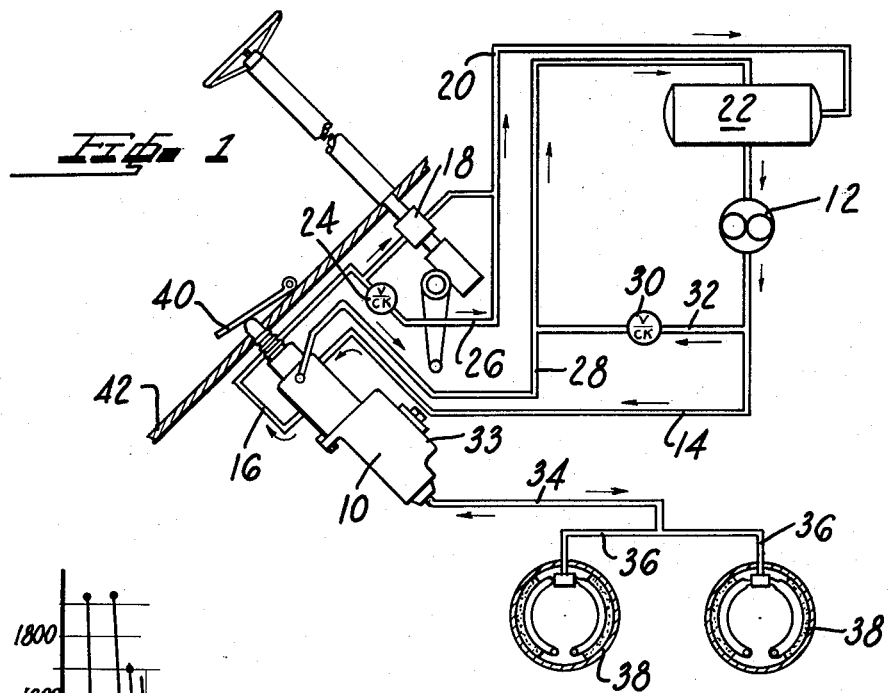
FIGURE 1 is a schematic view of the system showing the various connections and fluid conduits for the power steering and power braking systems.

Referring now to FIGURE 1, the system arrangement of control valve 10 is substantially the same as that shown in U.S. Patent No. 2,517,005 issued August 1, 1950 to Stanley I. MacDuff and assigned to Bendix Aviation Corporation. As shown, the power steering system includes a pump 12 connecting through conduit 14 to the control valve 10 and thence through line 16 to the open center power steering valve 18 which is connected through conduit 20 to the reservoir 22. A relief valve 24 and branch line 26 is included so that in the event of excessive pressure in line 16 the fluid can bypass power steering valve 18 and lead directly to the reservoir 22. Conduit 28 is a second return line from the control valve 10 leading to the reservoir 22 this return line 28 being the return line for the fluid which is diverted for applying the brake. As shown in FIGURE 1, if the fluid pressure requirements of the control valve should become excessive, the power steering and power braking control valve 10 can be shunted out completely by a relief valve 30 which is disposed in bypass branch 32 connected with line 28 leading to the reservoir 22.

The control valve 10 has a reservoir 33 filled with brake fluid which is subjected to pressure, in a manner to be later fully explained, this brake fluid under pressure being communicated through line 34 and branch lines 36 to apply the brakes 38.

A control valve is operated by the foot pedal 40 on the floor board 42.

Figure 3:
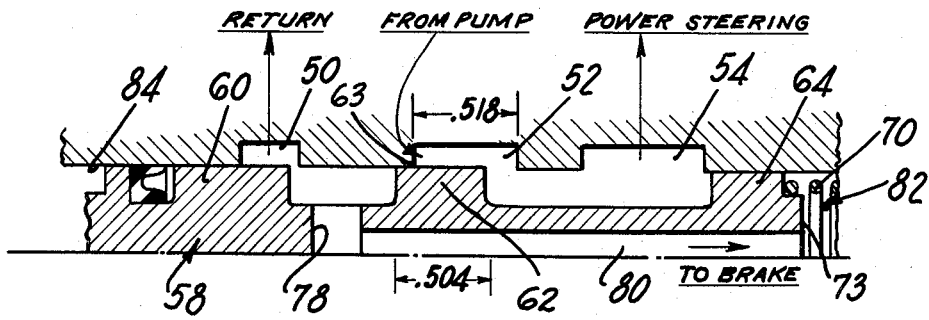
FIGURE 3 is an enlarged detail sectional view of the spool shown at one position which is the retracted or normal position of the spool within the sleeve.

Referring next to FIGURE 2 the valve body 44 is bored at 46 to receive a sleeve 48 having three grooves, the first being a return groove 50, an inlet groove 52 and a power steering groove 54. The sleeve 48 has a bore 56 which receives the spool 58 having lands 60, 62 and 64. It is the position of these lands relatively to the grooves that determines which of the two systems, the power steering system or the power braking system is receiving pressure from pump 12, and in what amount. The spool valve 58 is maintained in the position shown in FIGURES 2 and 3 by means of a spring 70 which is compressed between an orifice assembly 72 and end 73 of the spool valve, the orifice assembly 72 being held by means of a snap ring 74 in the sleeve 48. In the neutral position of the spool valve shown in FIGURES 2 and 3 the land 60 uncovers groove 50 leading to the return so that any pressure from pump 12 leading from chamber 52 is reduced substantially to zero pressure between lands 60 and 62. In other words leakage past the lapped position of land 62 goes from the return 50 to line 14 and to the reservoir 22 and therefore none of the pressure is communicated through radial bore 78 and longitudinal bore 80 to chamber 82 from which the brake is applied. As shown in FIGURE 3, the pump pressure is communicated past the underlapped portion of 62 in groove 52 to communicate with groove 54.

The power steering valve 18 is an open center valve requiring a continuous flow and therefore, if no braking is required the pump continues to pump fluid from groove 52 into groove 54 where it leads to conduit 16 connecting with the steering valve 18. The spool valve in other words does not move from its neutral position and is unaffected by power steering operation in the absence of brake operation. It might be pointed out at this portion of the description, that the invention is equally applicable to a closed center power steering system and whether the device 18 is an open center or a closed center power steering device is not an important part of the present invention.

Assuming next, that the power brakes are to be applied and disregarding power steering operation for the moment with the assumption that power steering pressure is less than brake pressure, the foot operated brake lever 40 forces the threaded stem 92 toward the right compressing the spring 94 against washer 95 held by shoulder 96 of a link 100 having a ball end 101 which forces the spool valve from its position shown in FIGURE 3 against the resistance of spring 70 to a position wherein land 60 first covers groove 50 leading to the return port and groove 52 communicating with the pump has its outlet to groove 54 at least partially closed by land 62 to produce a back pressure which causes fluid under pressure to flow through radial passage 78 (FIG. 4) thence through longitudinal passage 80 to chamber 82 from which it is vented at a controlled rate through small longitudinal passages 103 in the diaphragm 72. The vented fluid then acts against power piston 102 which is slidably mounted in bore 104. The power piston 102 acts through the plunger 106 which is sealed at 108 and has a piston head 110 which acts upon brake hydraulic fluid 112. The brake fluid is contained in a reservoir 33 which replenishes the fluid in cylinder 113 from a compensating port 116. It should be noted that the brake fluid 112 is completely sealed off from the fluid which is cycled through the power steering valve and portion of the unit to the left of power piston 102, the power piston 102 being sealed by a seal 118 and the annular space 120 is open to atmosphere through a filter 122. The master cylinder part of the assembly is bolted on to the body of the control valve 10 by means of bolts 124.

The reservoir 33 may be charged from time to time through a removable filter cap 126 which has vent openings to permit air to enter the reservoir 33 as required.

Figure 4:
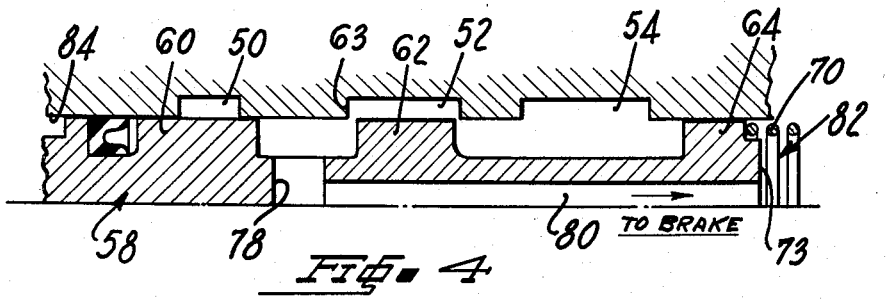
FIGURE 4 illustrates rightward movement of the spool valve in which power steering and power braking are concurrently provided and the valve operation is in accordance with "open center" control valve principles.
Figure 5:
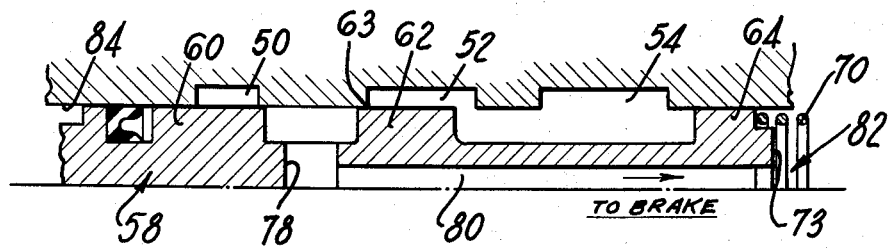
FIGURE 5 illustrates a further position of the spool in which the brake is being controlled by "closed center" control valve principles.

When the brake pedal is first depressed, as mentioned, the spool 58 is moved rightwardly from the position shown in FIGURE 3 to a position as for example the one in FIGURE 4 and the back pressure developed against the pump causes a pressure to build up quickly within chamber 82 where it then acts against the spool 58 biasing it leftwardly so that it will balance the effort developed by the operator on pedal 40 at which time the spool may assume a lapped position farther to the left as for example the position shown in FIGURE 5. Assuming that a constant brake pedal pressure is then to be maintained, the spool 58 will stay at a lapped position as shown in FIGURE 5 in which leakage from 52 past land 62 will equal the leakage past land 60 into groove 50 to maintain a constant pressure in chamber 82 from radial passages 78 and longitudinal passage 80 to balance the foot applied effort as determined by spring 94.

Having now considered the operation of the brake system apart from the steering system and operation of the steering system apart from the brake system, concurrent operations of the two systems will next be considered in light of the twofold problem (1) that the power steering operation must not measurably detract from operation of the brake and (2) the operation of the brake must not measurably detract from operation of the power steering. Considering first adverse effects upon the power steering by the braking operation, it should be evident by this time that the brake system does obtain a preference in diverting fluid under pressure for operating the brake and hence if the demand for brake fluid is excessive then this will become evident in the form of inadequate steering unless proper countermeasures are taken. For example, if the power steering should fail to respond promptly i.e. if it includes time lags greater than .2 second then the system is unsatisfactory (these statements are of course based on subjective reactions but, they are valid when considering the broad class of users of the system). To preclude objectionable time lags in the power steering portion of the system, it is provided that when the spool valve is moved from the position shown in FIGURE 3 to that of FIGURE 4 it is quickly restored to the position shown in FIGURE 5 by the counter-reaction developed from buildup of pressure in chamber 82, which is substantially smaller in capacity than the fluid requirements of the brake; and the faster buildup of pressure moves the spool 58 leftwardly to restore fluid flow from 52 to groove 54 connecting with the open center steering valve 18 and time required for buildup of pressure in chamber 84 is negligible because it is almost instantaneous. The buildup of pressure across passage 100 to communicate with the power piston 102 is not in excess of 0.2 second this time lag being determined by the size of the orifice or passage 103. Regardless of the brake operating effort, brake actuating pressure in 82 will build up at such a rate that counterreaction in chamber 82 moves the spool backwardly and noticeable reduction in the rate of fluid flow to the steering control valve will not continue for periods greater than 0.2 second so the operator is unaware that a portion of the pump capacity is diverted for braking purposes because of decreased efficiency of power steering operation. This result applies, regardless of the effort with which the operator applies the brake by means of a threaded sleeve 140 which is connected with the stem 92 through a bushing 142. The sleeve 140 will bottom on the end of sleeve 48 so that regardless of the amount of foot applying effort, the maximum amount of effort that can be transferred from the foot to the spool 58 is by compression of the spring through the distance "D" which is the clearance between the end of sleeve 140 and the sleeve 48. Assuming for example that fifty pounds effort is required to compress the spring 94 through the distance D, that is the amount of resistance that the spool 58 must overcome in being counterbalanced by the pressure in chamber 82 and any amount of operator applied effort in excess of that fifty pounds is simply resisted by contact between sleeves 140 and 48. Since the counterbalancing movement of the spool terminates brake operation, it should therefore be evident that the brakes are applied at predetermined maximums regardless of the operator's foot applied effort. This is a safety measure in that regardless of the amount of effort applied by the operator, the control device 10 will not function in favor of the brakes at the expense of the power steering system and also sudden demands for brake pressure might cause such high back pressures that the relief valve 30 is operated to shut off the control valve 10 (FIGURE 1) thus depriving the system of power steering for appreciable periods of time. As far as operation of the power brake portion of the system is concerned, it will be seen that the portion of the pump capacity which is diverted for operation of the brake, is controlled from a time standpoint by diverting fluid flow to a small chamber 82 which builds up in pressure at such a rate that the spool is restored to a position wherein fluid flow to the power steering unit is restored within a short period of time such that the momentary diversion is unnoticed by the operator. It should be noted here, that time delays in the power steering system are more apparent to the operator than time delays in braking and hence, any reduction in rate of brake application by the foregoing means, goes unnoticed and is nonobjectionable.

As mentioned, the brakes can be applied at a predetermined maximum rate regardless of the operator's effort. A maximum predetermined effort is permitted on the part of the operator to apply the brakes and no more; hence, it is impossible for the operator to demand braking which would deprive the system of power steering.

Considering next, the effect of power steering upon the power braking unit, reference will be made to the graphs FIGURES 6 and 7 and to the spool positions FIGURES 4 and 5.

The principal way in which power steering operation can interfere with braking operation is to transmit a pressure increase or impulse to the power steering system so that the operator experiences a jolt on the brake pedal 40. This condition arises in the following manner: assuming that the spool valve 58 is in the position shown in FIGURE 4 and a constant light brake-applying effort is being maintained at the foot pedal 40 and suddenly power steering requirements increase, then the power steering control valve 18 will develop a substantial increase of back pressure and the increase of pressure in groove 54 will produce a sudden increase in the pump pressure and therefore the increased pump pressure in groove 52, moves past the underlapped land 62 and radial passage 78, longitudinal passages 80 and chamber 82, moving the spool 58 leftwardly to maintain the balance of spring 94. This leftward movement of the spool valve transmits through the spring 94 a reaction force which is or can be an objectionable pedal reaction. That is, the operator must back off on his pedal or if he keeps the same pedal position, a jolting action will be transmitted to his foot to balance the increase of counter-reactions. It is one of the important features of the present invention that the spool 58 can be repositioned to maintain applying pressures for the brake so that pedal reaction is almost imperceptible owing to the slight longitudinal movements of the spool valve 58 which are necessary to compensate for increases in power steering pressure. For example, the land 62 is proportioned relatively to the groove 52 so that there is only in the order of twenty to thirty thousandths size differential between the land and the groove. Referring to FIGURE 6, which is a graph plotting "Pressure Drop vs. Spool Land Opening" it will be seen that the size of the land and groove, providing twenty to thirty thousandths of an inch opening, obtains substantial pressure drop variation per increment of movement. In other words, the operation of the land 62 and groove 52 is in the region of the knee or bend in the curve (FIGURE 6) so that longitudinal movement of the spool effects substantial change in pressure drop from the pump groove 52 past land 62 to radial passage 78, longitudinal passage 80 and chamber 82. Referring next to FIGURE 6 which shows master cylinder pressure vs. pedal movement, the effect on pedal travel will be considered for different power steering back pressures under conditions of engine idling speed producing a flow of two gallons per minute. I have taken, as an example, the engine idle condition because pedal movement is most greatly affected at low flow rates.

Referring to FIGURE 3, and considering first the condition of 250 p.s.i. power steering back pressure, the spool valve in moving from the position shown in FIG. 3 to that of FIG. 5 in which the groove 50 leading to the reservoir is lapped, there is produced a buildup of brake pressure of 350 p.s.i. with .6" pedal movement, the first increment of pedal movement occurring without any buildup of pressure because initially the brake pressure is immediately bled to the reservoir. Additional pedal movement from .60 to about .72" occurs before the land 62 is brought in line-to-line contact with the groove 52 at edge 63 but with the land 60 lapped in groove 50 so that buildup of brake pressure is similar to a closed center valve. When the land 62 moves beyond line-to-line contact with the groove at edge 63 the buildup of pressure then goes through a flat transition period and then continues at a constant slope according to an open center type valve.

Referring next to the buildup of brake pressure with 1000 p.s.i. back pressure for the steering pressure, it will be seen that brake pressure builds up considerably more quickly for a given pedal movement. These two different curves can illustrate how pedal movement is affected by change in power steering back pressure to create an objectionable pedal reaction which jolts the operator. For example, assume that spool 58 is positioned to provide 550 p.s.i. master cylinder brake pressure and the power steering back pressure is 250 p.s.i. indicating that the operator is lightly applying the brakes and steering effort is quite moderate. If the same brake pressure is to be maintained and power steering effort suddenly increases to 1000 p.s.i. back pressure, then the operator must develop 1000 p.s.i. back pressure, then the operator must have a back-off of the brake pedal from .80 to .65". This is the extreme of pedal movement change which is required in the present invention because the engine is idling and producing a low order of flow rate, in the order of 2 gal. per minute. While 0.15" brake pedal travel movement is not objectionable, it could easily be in the order of .25" or .50" retractile movement which would be very objectionable to the operator were it not for proper proportioning of land 62 and groove 52. That is, under operating conditions involving both power steering and power braking, the operator could experience highly objectionable counter-reaction at the pedal in order to maintain the same brake applying pressure. This difficulty is, of course, circumvented completely with the present invention.

While the present invention, has been illustrated, in conjunction with a single example embodiment, it will be appreciated that this is only illustrative of the invention, and is in no sense restrictive thereof. It is reasonable to be expected, that those skilled in the art, can make numerous revisions and adaptations of the invention as suit design requirements without departing from the underlying principles of the invention. It is intended therefore, that such revisions and variations of the invention as incorporate the herein disclosed principles, will be included within the scope of the following claims, as equivalents of the invention.

What is claimed is:

1. A control valve comprising housing means having a fluid pressure inlet port, a return port and a work port, said housing means further comprising a power chamber having a moveable position therein and a longitudinally extending opening, a spool valve member slidable in said opening and having at least a pair of axially spaced lands, the wall of said opening having a pair of axially spaced port means arranged to coact with said lands, one of said lands separating said opening into two axially spaced inner chambers with one of said inner chambers being located between said pair of lands, first passage means communicating one of said port means to said return port, second passage means communicating the other of said port means to said inlet port, third passage means including a radial passage in said spool valve member communicating with said one inner chamber and located between said lands and intersecting a longitudinal passage extending to one end of said spool valve member and into communication with said power chamber, and fourth passage means for communicating said work port with the other of said inner chambers, said lands being so constructed with relation to said port means that: when said spool valve member is in normal position relative to said port means, said one land will communicate said inlet port to said work port via said other inner chamber and cut off communication of said one inner chamber and said power chamber from said inlet port and the other of said lands will communicate said power chamber to said return port via said one inner chamber; when said spool valve member is in a transitory position, between said normal position and an operating position, relative to said port means, said lands will cut off communication of said one inner chamber and said power chamber from said inlet and return ports while said one land communicates said work port via said other inner chamber with said inlet; and when said spool valve member is in said operating position relative to said port means, said other land will cut off said one inner chamber and said power chamber from said return port and said one land will communicate said power chamber to said inlet port via said one inner chamber and communicate said work port to said inlet port via said other inner chamber; and means for actuating said spool valve member.

2. The structure as recited in claim 1 wherein said lands are so constructed with relation to said port means that when said spool valve member is in another operating position relative to said port means, which is the same position as said transitory position, pressure will be maintained in said power chamber, said another operating position occurring only when the pressure at said work port is greater than the pressure required by said power chamber and when the pressure required by said power chamber is reached.

3. A control valve comprising housing means having a fluid pressure inlet port, a return port and a work port, said housing means further comprising a power chamber having a moveable piston therein and a longitudinally extending opening (a spool valve member slidable in said opening and having at least a pair of axially spaced lands, the wall of said opening having a pair of axially spaced port means arranged to coact with said lands, one of said lands separating said opening into two axially spaced inner chambers with one of said inner chambers being located between said pair of lands, first passage means communicating one of said port means to said return port, second passage means communicating the other of said port means to said inlet port, third passage means including a radial passage in said spool valve member communicating with said one inner chamber and located between said lands and intersecting a longitudinal passage extending to one end of said spool valve member and into communication with said power chamber, and fourth passage means for communicating said work port with the other of said inner chambers, said lands being so constructed with relation to said port means that when: in normal position relative to each other, said one land will communicate said inlet port to said work port via said other inner chamber and cut off communication of said one inner chamber and said power chamber from said inlet port and the other of said lands will communicate said power chamber to said return port via said one inner chamber; in a transitory position relative to each other, said lands will cut off communication of said one inner chamber and said power chamber from said inlet port and said return port while said one land communicates said work port via said other inner chamber with said inlet port; in one operating position relative to each other, said other land will cut off said one inner chamber and said power chamber from said return port and said one land will communicate restricted flow from said inlet port to said power chamber via said one inner chamber and communicate unrestricted flow from said inlet port to said work port via said other inner chamber when the pressure at said work port is greater than that required by said power chamber; in a second operating position relative to each other, said other land will cut off said one inner chamber and said power chamber from said return port and said one land will communicate unrestricted flow from said inlet port to said power chamber via said one inner chamber and communicate restricted flow to said work port from said inlet port via said other inner chamber when the pressure required by said power chamber is greater than that at said work port; and in a third operating position relative to each other, which is the same as said transitory position, pressure is maintained in said power chamber; said third position being only when the pressure at said work port is greater than the pressure required by said power chamber and when the pressure required by said power chamber is reached; and means for actuating said spool valve member.

4. A control valve comprising housing means having a fluid pressure inlet port, a return port and a work port, said housing means further having a bore therein and a power chamber having a moveable piston therein, a hollow sleeve member located within said bore and defining a longitudinally extending opening, a spool valve member slidable in said opening and having three axially spaced lands, the inner surface of the wall of said sleeve having three axially spaced annular grooves communicated with said return port, said inlet port and said work port, respectively, the middle one of said lands separating said opening into two axially spaced inner chambers with one of said inner chambers being located between one outer land and said middle land and the other of said chambers being located between the other of said outer lands and said middle land, passage means including a radial passage in said spool valve member communicating with said one inner chamber and located between said one outer land and said middle land and intersecting a longitudinal passage extending to one end of said spool valve member and into communication with said power chamber, said lands being so constructed with relation to said annular grooves that: in normal position relative to each other, said middle land will communicate said inlet port to said work port via said other inner chamber and cut off communication of said one inner chamber and said power chamber from said inlet port and said one outer land will communicate said power chamber to said return port via said one inner chamber; in a transitory position relative to each other, said one outer land and said middle land will cut off communication of said one inner chamber and said power chamber with said inlet port and said return port while said middle land will communicate said work port via said other inner chamber with said inlet port; in one operating position relative to each other, said one outer land will cut off said one inner chamber and said power chamber from said return port and said middle land will communicate restricted flow from said inlet port to said power chamber via said one inner chamber and will communicate unrestricted flow from said inlet port to said work port via said other inner chamber when the pressure at said work port is greater than that required by said power chamber; in a second operating position relative to each other, said one outer land will cut off said one inner chamber and said power chamber from said return port and said middle land will communicate unrestricted flow from said inlet port to said power chamber via said one inner chamber and communicate restricted flow to said work port from said inlet port via said other inner chamber when the pressure required by said power chamber is greater than that at said work port; and in a third operating position relative to each other, which is the same as said transitory position, pressure will be maintained in said power chamber; said third position occurring only when the pressure at said work port is greater than the pressure required by said power chamber and when the pressure required by said power chamber is reached; and means for actuating said spool valve member.

5. The structure as recited in claim 4 wherein said middle land is of less width than said annular groove communicated to said inlet but not more than .030" less than the width thereof.

References Cited in the file of this patent

UNITED STATES PATENTS

| 2,517,005 | MacDuff | Aug. 1, 1950 |
| 2,624,361 | Brown | Jan. 6, 1953 |
| 2,896,666 | Rockwell | July 28, 1959 |
| 2,911,006 | Vogel | Nov. 3, 1959 |
| 2,945,352 | Stelzer | July 19, 1960 |
| 2,957,311 | Stelzer | Oct. 25, 1960 |
| 2,964,909 | Garrison | Dec. 20, 1960 |